(12) United States Patent
Yoshikawa et al.

(10) Patent No.: US 7,280,148 B2
(45) Date of Patent: Oct. 9, 2007

(54) OPTICAL CONTROL SYSTEM

(75) Inventors: Kazumasa Yoshikawa, Tochigi (JP);
Isao Tanaka, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 779 days.

(21) Appl. No.: 10/827,849

(22) Filed: Apr. 20, 2004

(65) Prior Publication Data

US 2004/0212722 A1    Oct. 28, 2004

(30) Foreign Application Priority Data

Apr. 24, 2003   (JP) .............................. 2003-120457

(51) Int. Cl.
G03B 13/00    (2006.01)
G03B 3/00     (2006.01)
H04N 5/232    (2006.01)

(52) U.S. Cl. ....................................... 348/345; 396/137
(58) Field of Classification Search ................ 396/131, 396/137; 348/211.7, 345, 357
See application file for complete search history.

(56) References Cited

U.S. PATENT DOCUMENTS 4,556,907 A * 12/1985 Urata et al. .............. 348/211.4
4,935,762 A * 6/1990 Yoon .......................... 396/137
5,408,332 A    4/1995 Murakami et al.
6,172,709 B1 * 1/2001 Yamano et al. ............. 348/360
2002/0075395 A1 * 6/2002 Ohkawara ................... 348/360
2004/0189859 A1 * 9/2004 Yoshikawa .................. 348/360

FOREIGN PATENT DOCUMENTS

DE   19 79 885   2/1968
DE   30 25 776   2/1982
JP    9 065184   7/1997

* cited by examiner

*Primary Examiner*—Lin Ye
*Assistant Examiner*—Jason Whipkey
(74) *Attorney, Agent, or Firm*—Morgan & Finnegan, L.L.P.

(57) ABSTRACT

The optical control system includes a control unit and an optical apparatus. The control unit includes an output switching section. The output switching section is switchable between a first state, in which the command signal from a command signal generation section is output via a first terminal of a first connector, and a second state, in which a switching signal for selecting the second control section, the voltage level of the switching signal being different from that of the command signal, is output from the first terminal. The control switching section of the optical apparatus selects the first control section in response to input of the command signal, and selects the second control section in response to the switching signal, which is input from the second terminal of the second connector.

7 Claims, 9 Drawing Sheets

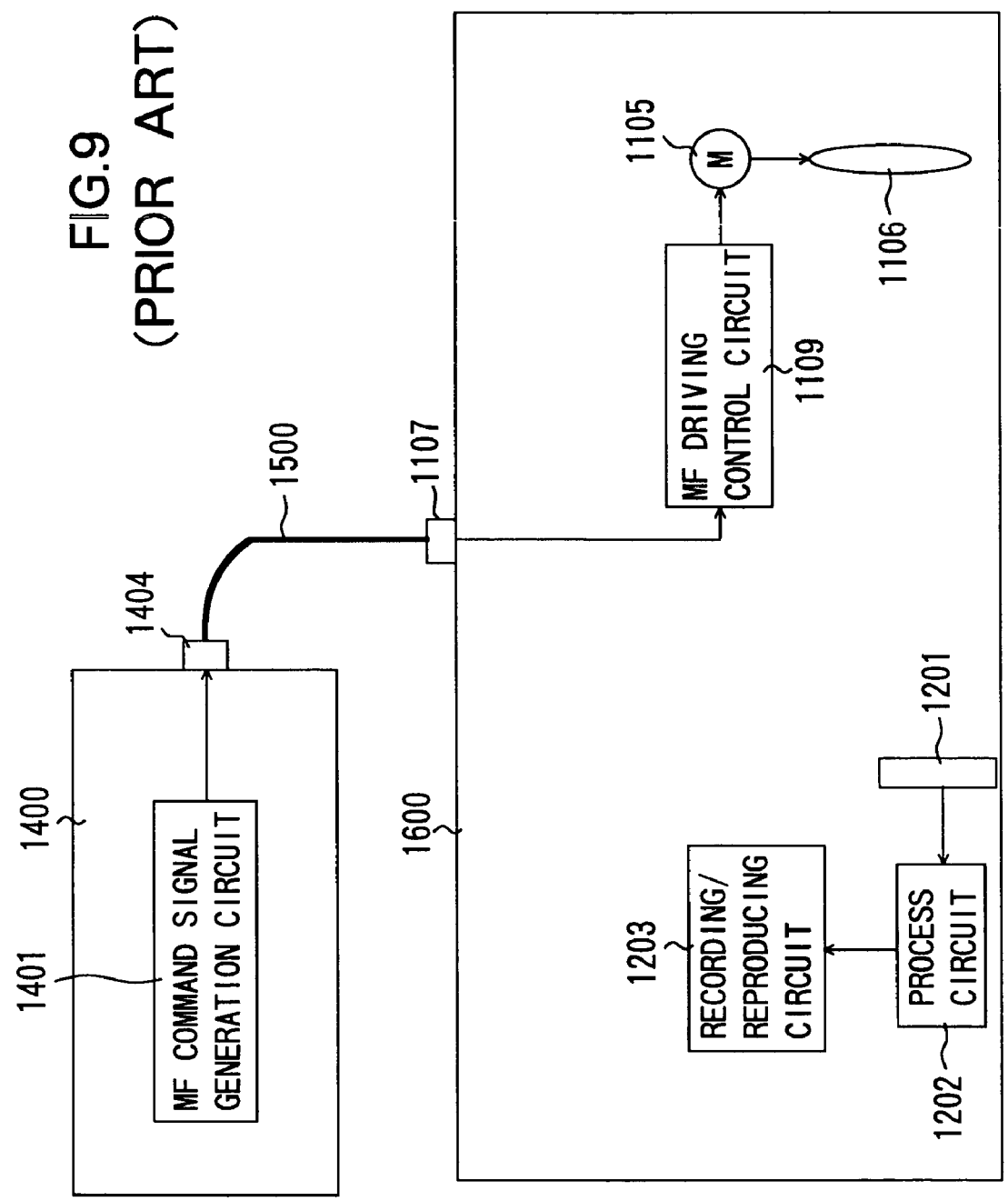

OPTICAL CONTROL SYSTEM

BACKGROUND OF THE INVENTION

1. Field of the Invention

The present invention relates to optical control systems used in optical apparatuses, such as television cameras, video cameras, television lenses, video lenses or the like, that can perform automatic focus control (referred to as "AF control" in the following) as well as manual focus control (referred to as "MF control" in the following).

2. Description of Related Art

Optical apparatuses are known which have an AF control function, such as the optical apparatus disclosed in FIG. 1 of Japanese Patent Application Laid Open No. H9 (1997)-65184, for example. Moreover, there are optical apparatuses which perform focus control of an image-taking optical system by extracting, from the taken video signals, a signal (high-frequency components) related to the sharpness of the object, which corresponds to the focusing state of the image-taking optical system, and evaluating that signal, in order to perform AF control.

An example of this AF control is explained with reference to FIG. 8. In FIG. 8, reference numeral 1600 denotes a video camera with integrated image-taking lens. Reference numeral 1102 denotes an evaluation value generation circuit, which generates a sharpness evaluation signal from a video signal output by a later-described process circuit 1202, and reference numeral 1103 denotes an AF driving control circuit, which generates such a motor control signal that the sharpness evaluation value generated by the evaluation value generation circuit 1102 becomes maximal.

Reference numeral 1105 denotes a motor, whose rotation speed is controlled by the AF driving control circuit 1103, and reference numeral 1106 denotes a focus lens, which receives the driving force of the motor 1105 and is moved in the direction of the optical axis.

Reference numeral 1201 denotes a CCD, which photoelectrically converts object images formed by the image-taking optical system (not shown in its entirety in FIG. 8) including the focus lens 1106. The process circuit 1202 processes the output signal from the CCD 1201 and turns it into a video signal in accordance with a predetermined format, such as NTSC or PAL format. Reference numeral 1203 denotes a recording/reproducing circuit, which records the video signal output from the process circuit 1202 onto a recording medium, such as a tape, a semiconductor memory or the like.

In the above-described structure, light flux which has passed through the image-taking optical system (focus lens 1106) forms an image on an image-pickup surface of the CCD 1201, and after being photoelectrically converted by the CCD 1201, the signal output from the CCD 1201 is sampled and held and input into the process circuit 1202. The process circuit 1202 processes the input signal into a video signal of the predetermined format, and outputs the video signal to the evaluation value generation circuit 1102 and the recording/reproducing circuit 1203.

By filtering the input video signal, the evaluation value generation circuit 1102 generates, at vertical synchronization units of the video signal, sharpness evaluation value signals related to the high-frequency components of the video signal, and outputs the sharpness evaluation value signals to the AF driving control circuit 1103. While driving the motor 1105 to move the focus lens 1106 by incremental steps, the AF driving control circuit 1103 compares, at vertical synchronization units, the sharpness evaluation value signals, which are successively input from the evaluation value generation circuit 1102, and moves the focus lens 1106 to a position where the sharpness evaluation value becomes maximal. Thus, the focus lens 1106 attains an in-focus position.

The recording/reproducing circuit 1203 records the video signal output from the process circuit 1202 to a recording medium. It should be noted that the recording/reproducing circuit 1203 also performs the reproducing of video recorded on the recording medium.

A camera system performing such AF control is disclosed in Patent Document 1, for example.

There are furthermore optical apparatuses for special applications, such as surveillance, which can be operated remotely. Many of such optical apparatuses are not equipped with an AF control function, and in this case, they are configured for remote control of the focus, with the user operating a switch or knob or the like provided on a remote control unit.

A system adapted for such remote focus operation is explained with reference to FIG. 9. In FIG. 9, structural elements that are the same as in FIG. 8 are given the same reference numerals as in FIG. 8 and are not further explained.

Reference numeral 1400 denotes a remote control unit, which supplies command signals for driving a zoom lens, an iris (not shown in the drawings) and the focus lens 1106 of the image-taking optical system to a camera 1600, from a location that is at a certain distance to the camera 1600.

In the remote control unit 1400, reference numeral 1401 denotes an MF command signal generation circuit, which generates an MF command signal in accordance with the operation of a switch or a knob (not shown in the drawings), and reference numeral 1404 denotes a remote control-side connector, which is connected to a remote control cable 1500, and through which the MF command signal is output to the camera 1600.

In the camera 1600, reference numeral 1107 denotes a camera-side connector to which the remote cable 1500 is connected, and reference numeral 1109 denotes an MF driving control circuit, which generates a motor control signal for driving the motor 1105, based on the manual focus (MF) command signal from the remote control unit 1400. The focus lens is moved in the optical axis direction by driving the motor 1105 with the motor control signal from the MF driving control circuit 1109. Thus, it is possible to perform MF control by operating a switch or the like on the remote control unit 1400.

In the above-described remotely operated system, an electrical interface is established between the remote control unit and the camera, and the number of connecter pins (terminals) is set to twelve. And in their current form, the command signals for zoom, iris and focus, as well as the various control mode signals (for switching high-speed control and position control, for example), power and ground are assigned to these twelve pins, and there are no free pins left.

Therefore, when trying to equip the above-described remote system with the AF control function illustrated in FIG. 9, then it is not possible to assign a pin to a signal for switching the driving of the focus lens between AF control and MF control from the remote control unit, which is a new signal that needs to be sent from the remote control unit to the camera. That is to say, it is not possible to make a selection between AF control and MF control from the remote control unit.

SUMMARY OF THE INVENTION

It is an object of the present invention to provide an optical control system, with which the selection of automatic control and manual control as well as the manual remote control of an optical adjusting means can be carried out from a remote control unit, without providing the remote control unit and the optical apparatus with new connector terminals.

According to one aspect of the present invention, an optical control system comprises a control unit and an optical apparatus. The control unit comprises a command signal generation section, which generates a command signal in response to operation of an operating member, and a first connector, which is connected to a communication cable and outputs the command signal from a first terminal thereof via the communication cable. The optical apparatus comprises an optical adjusting member, which is movable to perform an optical action, an actuator driving the optical adjusting member, a second connector which is connected to the communication cable, a first control section, which controls the actuator based on the command signal input via a second terminal of the second connector from the control unit, a second control section, which controls the actuator based on predetermined information, and a control switching section, which selects, from the first and the second control sections, the control section controlling the driving of the actuator.

The control unit comprises an output switching section, which is switchable between a first state, in which the command signal from the command signal generation section is output via the first terminal of the first connector, and a second state, in which a switching signal for selecting the second control section, the voltage level of the switching signal being different from that of the command signal, is output from the first terminal.

The control switching section of the optical apparatus selects the first control section in response to input of the command signal, and selects the second control section in response to the switching signal input, which is input from the same terminal of the second connector as the command signal.

According to another aspect of the present invention, an optical control system comprises a control unit and an optical apparatus. The control unit comprises a command signal generation section, which generates a command signal in response to operation of an operating member, and a first connector, which is connected to a communication cable and outputs the command signal from a first terminal thereof via the communication cable. The optical apparatus comprises an optical adjusting member, which is movable to perform an optical action, an actuator driving the optical adjusting member, a second connector which is connected to the communication cable, a first control section, which controls the actuator based on the command signal input via a second terminal of the second connector from the control unit, a second control section, which controls the actuator based on predetermined information, and a control switching section, which selects, from the first and the second control sections, the control section controlling the driving of the actuator.

The control unit comprises an output switching section, which is switchable from a first state, in which the command signal from the command signal generation section is output via the first terminal of the first connector, to a second state, in which a switching signal for selecting one of the first control section and the second control section, is output from the first terminal, the output switching section being restored to the first state from the second state when the switching operation is released.

The control switching section of the optical apparatus selects the first control section and the second control section in alternation in response to input of the switching signal from the second terminal of the second connector, and the first control section is selected when the command signal is input while the second control section is selected.

These and further objects and features of the optical control system according to the present invention will become apparent from the following detailed description of preferred embodiments thereof taken in conjunction with the accompanying drawings.

BRIEF DESCRIPTION OF THE DRAWINGS

FIG. 9 shows the structure of a conventional optical control system.

DETAILED DESCRIPTION OF THE PREFERRED EMBODIMENTS

Embodiment 1

Figure 1:
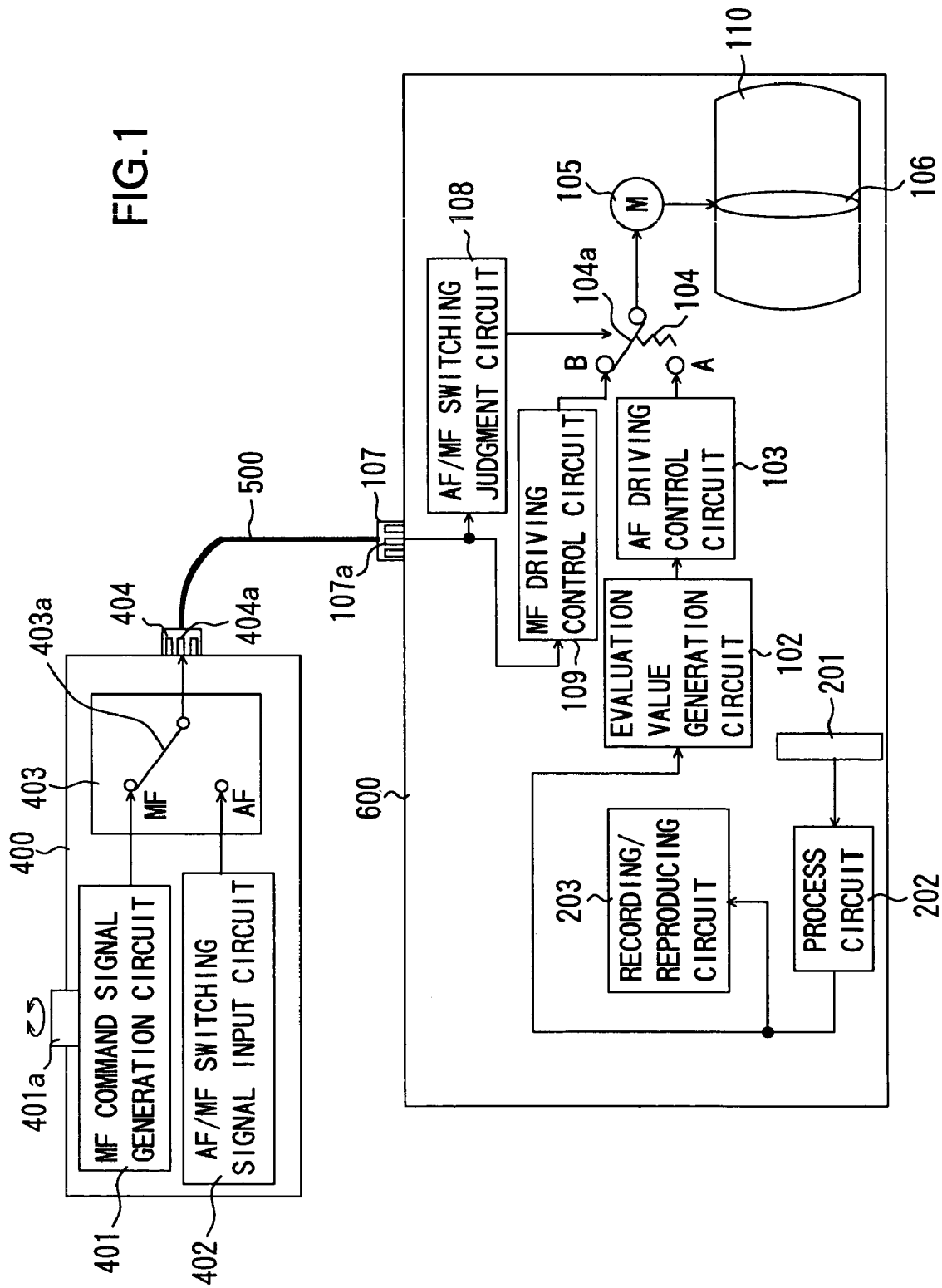
FIG. 1 shows the structure of an optical control system according to Embodiment 1 of the present invention.

FIG. 1 shows the structure of an optical control system according to Embodiment 1 of the present invention. In FIG. 1, reference numeral 600 denotes a video camera incorporating an image-taking optical system 110, and reference numeral 400 denotes a remote control unit. The remote control unit 400 outputs command signals for driving a zoom lens, an iris (not shown in the drawings) and a focus lens 106 in the image-taking optical system 110 to the camera 600, from a location that is at a certain distance to the camera 600. Reference numeral 500 denotes a remote control cable connecting the camera 600 and the remote control unit 400.

In the remote control unit 400, reference numeral 401 denotes an MF command signal generation circuit, which generates an MF command signal for MF control of the focus lens 106. The MF command signal generation circuit 401 generates an MF command signal, which causes the focus lens 106 to move in a direction corresponding to the direction in which a potentiometer-type switch (dial-type or seesaw-type) 401a is operated, in proportion to the operated amount.

Reference numeral 402 denotes an AF/MF switching signal input circuit, which outputs an AF switching signal for selecting AF control of the focus lens 106.

Reference numeral 403 denotes a command/switching signal circuit. This command/switching signal circuit 403 selectively outputs the MF command signal from the MF command signal generation circuit 401 or the AF switching signal from the AF/MF switching signal input circuit 402 to the same predetermined pin 404a, which is one of the twelve terminals (pins) of the remote control-side connector (first connector) 404.

More specifically, the command/switching signal circuit 403 is configured to have a switching contact piece 403a, which is connected to the pin 404a and is switchable between a state of contacting an MF contact connected to the MF command signal generation circuit 401 (MF position: referred to as "first state" in the claims) and a state of contacting an AF contact connected to the AF/MF switching signal input circuit 402 (AF position: referred to as "second state" in the claims). It should be noted that after the switching contact piece 403a has been operated to assume either the AF position or the MF position, the switching contact piece 403a will stay in that position until it is operated to the other position, thus constituting an alternating switch.

The AF/MF switching signal input circuit 402 and the command/switching signal circuit 403 constitute what is referred to in the claims as an "output switching section."

In the camera 600, reference numeral 102 denotes an evaluation value generation circuit (focus information generation section), which generates a sharpness evaluation value signal from the video signal output from a process circuit 202 (explained later), and reference numeral 103 denotes an AF driving control circuit, which generates such a motor control signal that the sharpness evaluation value generated by the evaluation value generation circuit 102 becomes maximal.

Reference numeral 104 denotes an AF/MF switching circuit, which is controlled by a later-described AF/MF switching judgment circuit 108, and which is switched depending on whether the focus lens 106 is driven by a control signal from the AF driving control circuit (first control section) 103 or whether it is driven by a control signal from a later-described MF driving control circuit (second control section) 109. It should be noted that the AF/MF switching judgment circuit 108 and the AF/MF switching circuit 104 constitute what is referred to in the claims as a "control switching section."

Reference numeral 105 denotes a motor, which is operated by the control signals input from the AF driving control circuit 103 and the MF driving control circuit 109 via the AF/MF switching circuit 104.

Reference numeral 107 denotes a camera-side connector (second connector), to which the remote control cable 500 is connected.

The AF/MF switching judgment circuit 108 is connected to a pin 107a in the camera-side connector 107, this pin 107a being an input terminal for the MF command signal sent from the remote control unit 400 to the MF driving control circuit 109. Therefore, the MF command signal and the AF switching signal from the AF/MF switching signal input circuit 402 are input into the AF/MF switching judgment circuit 108. The AF/MF switching judgment circuit 108 judges whether the input signal is an MF command signal or an AF switching signal and, depending on the result of this judgment, switches the AF/MF switching circuit 104 to the MF driving control circuit 109 or the AF driving control circuit 103.

More specifically, the AF/MF switching circuit 104 includes a movable contact piece 104a, which is switchable between a state in which it contacts a contact B connected to the MF driving control circuit 109 and a state in which it contacts a contact A connected to the AF driving control circuit 103, as well as an electromagnet (not shown in the drawings), which drives the movable contact piece 104a. When judging that an AF switching signal is input, the AF/MF switching judgment circuit 108 sends a current through the electromagnet of the AF/MF switching circuit 104, generating a force pulling the movable contact piece 104a to the contact A, and setting the movable contact piece 104a to the contact A. And when judging that an MF command signal is input, the AF/MF switching judgment circuit 108 does not send a current through the electromagnet of the AF/MF switching circuit 104 (or stops the current if a current has been sent up to that time), setting the movable contact piece 104a by spring force to the contact B.

The MF driving control circuit 109 generates a control signal, which drives the motor 105, based on the MF command signal from the remote control unit 400.

Reference numeral 201 denotes an image-pickup device made of a CCD or CMOS sensor or the like. The process circuit 202 processes the signals output from the image-pickup device 201 to generate a video signal of a predetermined format, such as NTSC or PAL format.

Reference numeral 203 denotes a recording/reproducing circuit, which records the video signal output from the process circuit 202 onto a recording medium, such as a tape, a semiconductor memory, an optical disk or the like, or reproduces the recorded video.

In the above-described structure, light flux which has passed through the image-taking optical system 110 forms an image on an image-pickup surface of the image-pickup device 201, and after being photoelectrically converted by the image-pickup device 201, the electrical signal output from the image-pickup device 201 is sampled and held and input into the process circuit 202. The process circuit 202 processes the input signal into a video signal of the predetermined format, and outputs the video signal to the evaluation value generation circuit 102 and the recording/reproducing circuit 203.

In AF control, by filtering the input video signal, the evaluation value generation circuit 102 generates, at vertical synchronization units of the video signal, a sharpness evaluation value signal related to the high-frequency components of the video signal, and outputs the sharpness evaluation value signal to the AF driving control circuit 103. While driving the motor 105 to move the focus lens 106 by incremental steps, the AF driving control circuit 103 compares, at vertical synchronization units, the sharpness evaluation value signals, which are successively input from the evaluation value generation circuit 102, and moves the focus lens 106 to a position where the sharpness evaluation value becomes maximal, that is, to the in-focus position. Thus, AF control of the focus lens 106 is performed.

More specifically, the AF driving control circuit 103 moves the focus lens 106 in incremental steps, and depending on the change of the sharpness evaluation value in that situation, it is judged whether the in-focus position is further to the tele-angle side or further to the wide-angle side with respect to the current position of the focus lens 106, that is, a driving direction judgment is performed. After that, in accordance with the result of the driving direction judgment, the focus lens 106 is moved at a certain speed in order to detect the peak value of the sharpness evaluation value. This is also referred to as "hill-climbing." After the peak value has been exceeded, the movement direction of the focus lens 106 is reversed, and the focus lens 106 is moved in incremental steps such that it is guided to the position where the sharpness evaluation value becomes maximal. This is referred to as "peak-finding." Thus, the AF control of the focus lens 106 is finished.

It should be noted that after the peak-finding, the sharpness evaluation value is compared with the value found as the peak, while reading the sharpness evaluation value, and if the sharpness evaluation value has changed, then the AF control is started again.

The following is an explanation of the operation for switching the system between MF and AF control with the AF/MF switching judgment circuit 108.

When the command/switching signal circuit 403 of the remote control unit 400 is set to the AF position, then an AF switching signal from the AF/MF switching signal input circuit 402 is input via the pin 404a of the remote control-side connector 404, the remote control cable 500 and the pin 107a of the camera-side connector 107 to the AF/MF switching judgment circuit 108.

When the command/switching signal circuit 403 of the remote control unit 400 is set to the MF position, then an MF command signal from the MF command signal generation circuit 401 is input via the pin 404a of the remote control-side connector 404, the remote control cable 500 and the pin 107a of the camera-side connector 107 to the AF/MF switching judgment circuit 108.

Here, the MF command signal from the MF command signal generation circuit 401 is a signal in the voltage range of +2.5 V (Volt) to +7.5 V. That is to say, if the focus lens 106 is speed-controlled, +5.0 V is taken as a stop command signal, in case of +5.0 V to +7.5 V, the focus lens 106 is driven towards infinity and in case of +5.0 V to +2.5 V, the focus lens 106 is driven towards close-range. Moreover, the driving speed of the focus lens 106 (the motor 105) at this time is faster the further the voltage of the MF command signal is removed from +5.0 V, and is the maximal possible driving speed at +7.5 V and +2.5 V, respectively.

On the other hand, the AF switching signal from the AF/MF switching signal input circuit 402 is set to 0V, which is outside the voltage range of the MF command signal.

Figure 2:
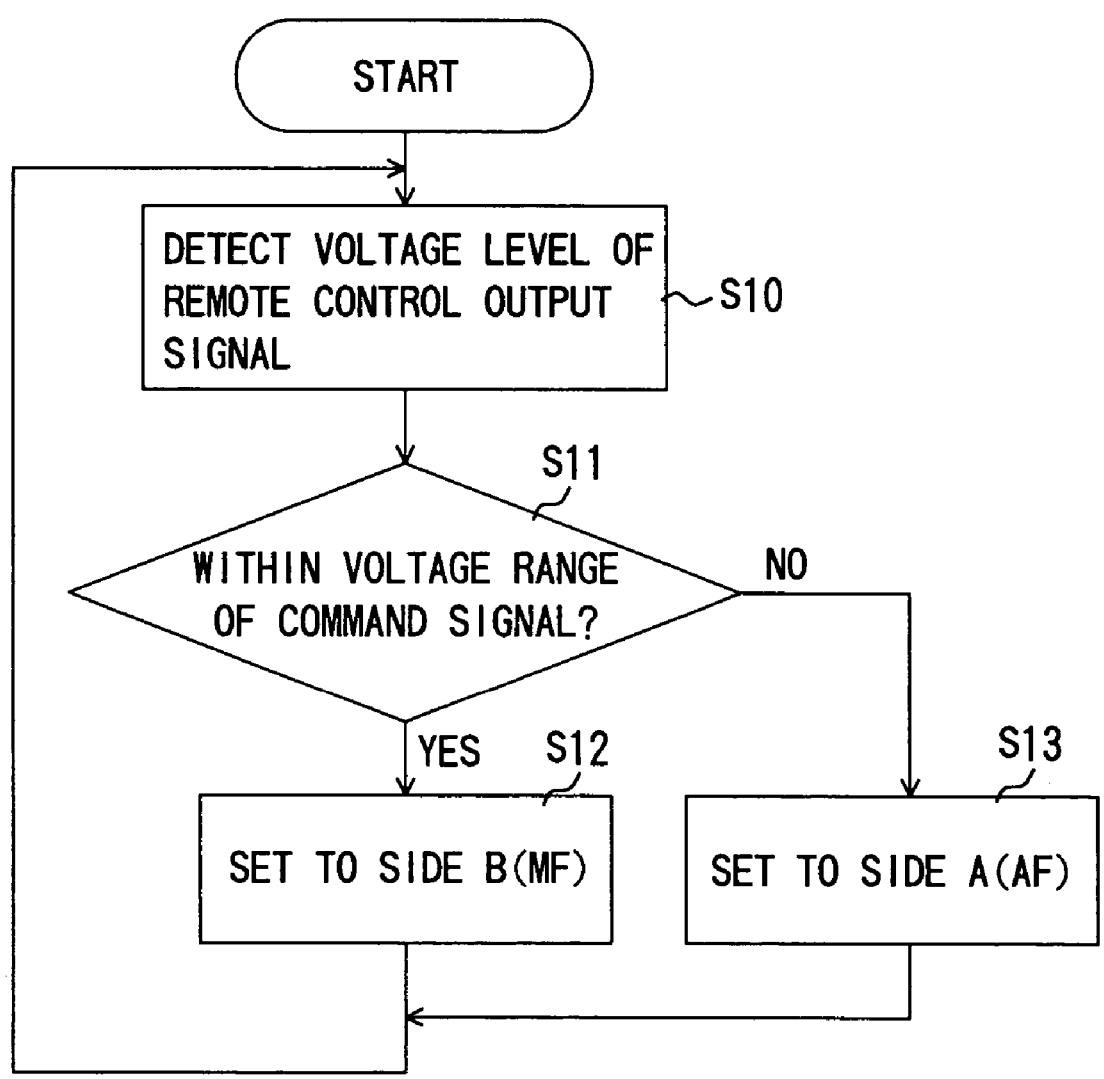
FIG. 2 is a flowchart showing the operation of the optical control system according to Embodiment 1.

The AF/MF switching judgment circuit 108 operates in accordance with the flowchart shown in FIG. 2. First, at Step 10 (in the drawings, steps are abbreviated to "S"), the voltage level of the output signal input from the remote control unit 400 is detected.

Next, at Step 11, it is judged whether the detected voltage level is within the voltage range of the MF command signal (+2.5 V to +7.5 V). If it is within the voltage range of the MF command signal, the procedure advances to Step 12, and no current is sent through the electromagnet, so that the AF/MF switching circuit 104 is set to the side of the contact B (MF control). Thus, a control signal from the MF driving control circuit 109, which has received the MF command signal from the remote control unit 400, is input into the motor 105, and directional and speed control (MF control) of the focus lens 106 is performed in accordance with the MF command signal.

On the other hand, if at Step 11 the detected voltage level is outside the voltage range of the MF command signal (that is, if the detected voltage level is 0V and thus an AF switching signal), then the procedure advances to Step 13, and a current is sent through the electromagnet, so that the AF/MF switching circuit 104 is set to the side of the contact A (AF control). Thus, the control signal from the AF driving control circuit 103 is input into the motor 105, and the above-mentioned AF control is performed.

It should be noted that the program shown in the flowchart is executed repeatedly while the system is in operation, and by switching the command/switching signal circuit 403 to the MF position while in the AF control state, the camera 600 switches immediately to the MF control state, and by switching the command/switching signal circuit 403 to the AF position while in the MF control state, the camera 600 switches immediately to the AF control state.

In this manner, the present embodiment uses the pins 404a and 107a of the connectors 404 and 107, which are assigned for sending MF command signals from the remote control unit 400 to the camera 600, so that it is possible to switch the camera 600 between MF control and AF control from the remote control unit 400.

Consequently, if a conventional camera capable of MF control from the remote control unit is equipped with an AF control function, then MF control and AF control can be switched from the remote control unit even if the electrical interface (connector) has no free terminals (pins), that is, no terminals that are not assigned otherwise, and it is possible to make the operation of the optical control system more convenient.

Embodiment 2

In the above-described Embodiment 1, a camera with integrated lens was explained, in which the camera 600 incorporates the image-taking optical system 110, but the present invention can also be applied to optical control systems having an exchangeable lens unit (optical apparatus) that is freely attachable/detachable with respect to the camera.

Figure 3:
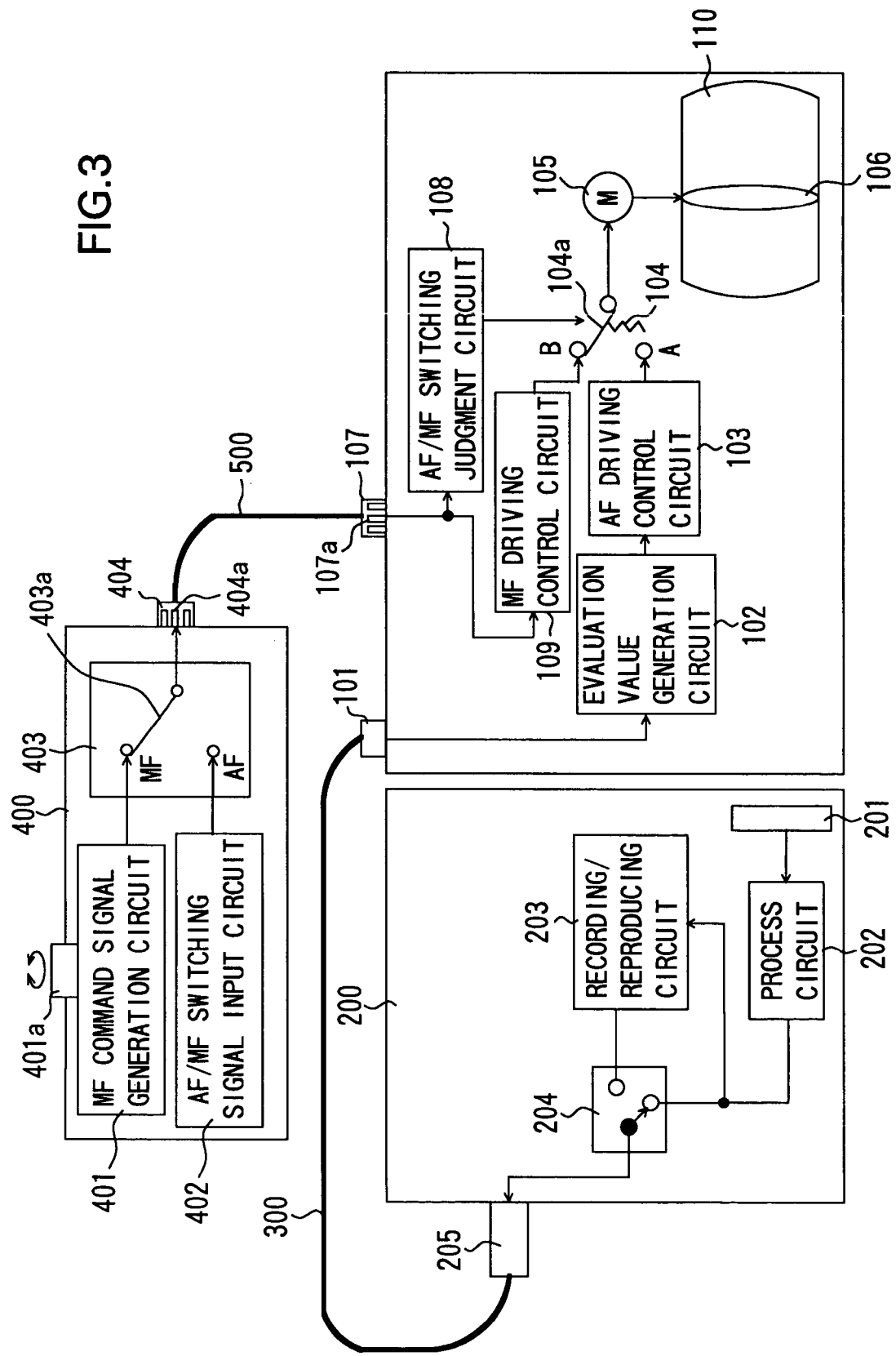
FIG. 3 shows the structure of an optical control system according to Embodiment 2 of the present invention.

FIG. 3 shows the structure of an optical control system according to Embodiment 2 of the present invention. In FIG. 3, reference numeral 100 denotes an exchangeable lens unit, and reference numeral 200 denotes a video camera. Reference numeral 300 denotes a coaxial video cable connected to the exchangeable lens unit 100 and the camera 200.

It should be noted that in this embodiment, structural elements that are the same as in Embodiment 1 are denoted by the same reference numerals as in Embodiment 1 (FIG. 1), instead of further explanation. Moreover, in this embodiment, of the structural elements within the camera 600 explained in Embodiment 1, the image-pickup device 201, the process circuit 202 and the recording/reproducing circuit 203 are arranged on the side of the camera 200, whereas the other structural elements are arranged on the side of the lens unit 100. The remote control unit 400 is connected via the connectors 404 and 107 and the remote cable 500 to the lens unit 100.

In the lens unit 100, reference numeral 101 denotes a video input terminal to which video signals are input via the coaxial video cable 300. Moreover, in the camera 200, reference numeral 204 denotes a video switching circuit, which selects and outputs either the video signals output from the process circuit 202 or the video signals output from the recording/reproducing circuit 203. Reference numeral 205 denotes a video output terminal, which outputs the video signals output from the video switching circuit 204 via the coaxial video cable 300 to the lens unit 100.

In this structure, after the light flux passing through the image-taking optical system 110 on the side of the lens unit 100 is imaged onto the image-pickup plane of the image-pickup device 201 on the side of the camera 200 and photoelectrically converted by the image-pickup device 201, the output signal of the image-pickup device 201 is sampled and held and input into the process circuit 202. The process circuit 202 processes the input signal into a video signal of the predetermined format, and outputs it to the video switching circuit 204 and the recording/reproducing circuit 203.

During the recording operation, the video switching circuit 204 outputs the video signals from the process circuit 202 to the video output terminal 205. In this case, the recording/reproducing circuit 203 records the video signal from the process circuit 202 onto a recording medium. Moreover, when reproducing recorded video, the recording/reproducing circuit 203 reproduces the video signals recorded on a recording medium, and when these video signals have been stably reproduced, the video switching circuit 204 outputs the video signals from the recording/reproducing circuit 203 to the video output terminal 205.

Then, the video signals are input from the video output terminal 205 via the coaxial video cable 300 and the video input terminal 101 of the lens unit 100 into the evaluation value generation circuit 102.

By filtering the input video signal, the evaluation value generation circuit 102 generates, at vertical synchronization units of the video signal, a sharpness evaluation value signal related to the high-frequency components of the video signal, and outputs the sharpness evaluation value signal to the AF driving control circuit 103. While driving the motor 105 to move the focus lens 106 by incremental steps, the AF driving control circuit 103 compares, at vertical synchronization units, the sharpness evaluation value signals, which are successively input from the evaluation value generation circuit 102, and moves the focus lens 106 to a position where the sharpness evaluation value becomes maximal, that is, to the in-focus position. Thus, the AF control of the focus lens 106 is carried out.

In the present embodiment, the switching operation between MF and AF control with the AF/MF switching judgment circuit 108 is the same as that explained for Embodiment 1 (FIG. 2).

Also the present embodiment uses the pins 404a and 107a of the connectors 404 and 107 assigned for sending MF command signals from the remote control unit 400 to the lens unit 100, so that it is possible to switch the lens unit 100 between MF control and AF control from the remote control unit 400.

Consequently, if a conventional exchangeable lens unit capable of MF control from the remote control unit is equipped with an AF control function, then MF control and AF control can be switched from the remote control unit even if the electrical interface (connector) has no free terminals (pins), that is, no terminals that are not assigned otherwise, and it is possible to make the operation of the optical control system more convenient.

It should be noted that the voltage range of the MF command signals and the voltage value for the AF switching signal given in Embodiments 1 and 2 are merely examples, and other voltage ranges and voltage values are also possible.

Moreover, Embodiments 1 and 2 are explained for the case that the command/switching signal circuit 403 is directly switched, however it is also possible to provide the AF/MF switching signal input circuit 402 with an operation switch, and to let the switching contact piece 403a of the command/switching signal circuit 403 switch by the action of an electromagnet or the like, in accordance with the switching of this operation switch.

Furthermore, Embodiments 1 and 2 were explained for the case that automatic control and manual control of the focus lens is performed, however, it is also possible to apply the present invention to cases where automatic control and manual control of other optical adjusting members, such as the zoom lens or the iris, are performed.

Embodiment 3

Figure 4:
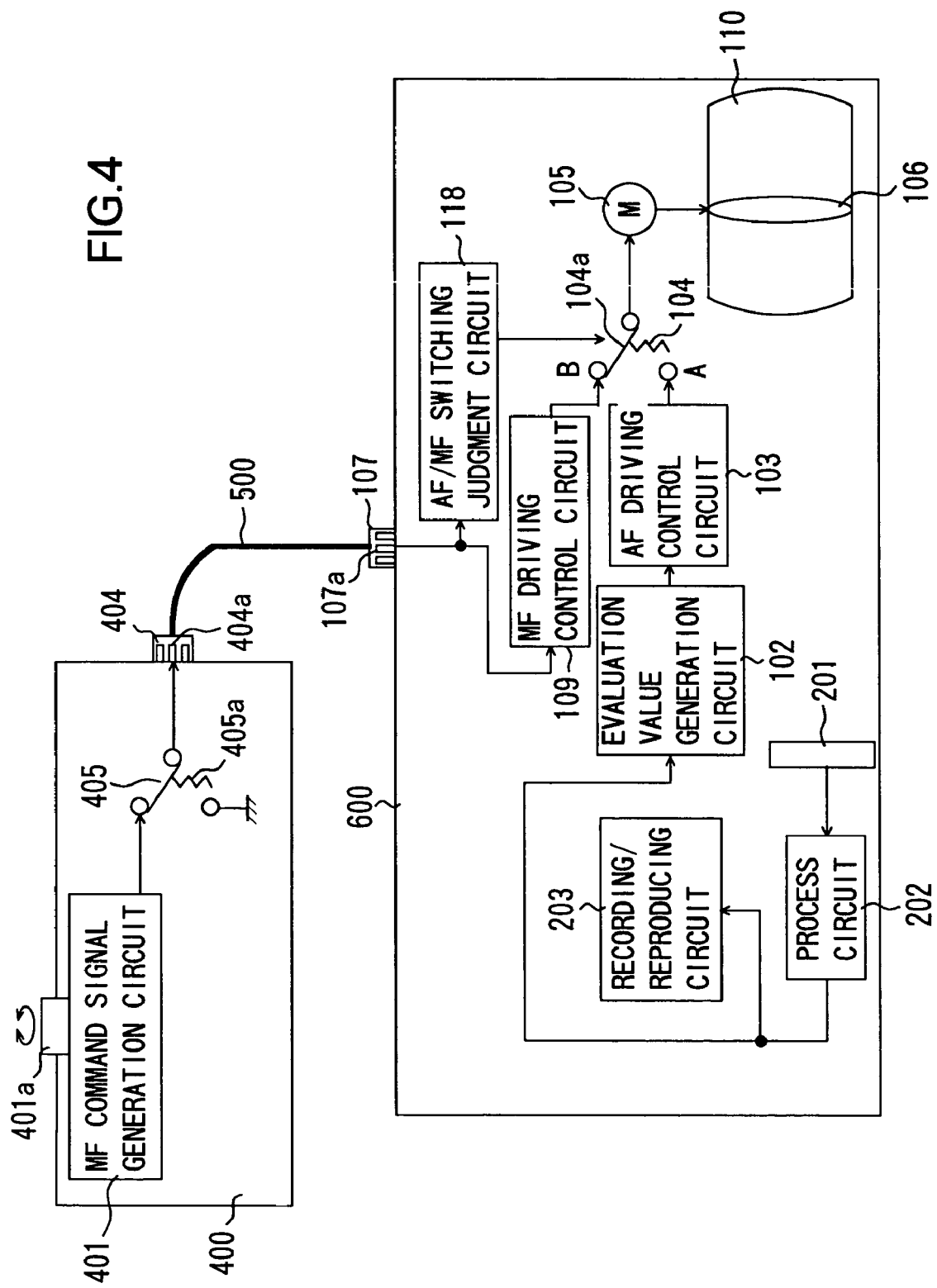
FIG. 4 shows the structure of an optical control system according to Embodiment 3 of the present invention.

FIG. 4 shows the structure of an optical control system according to Embodiment 3 of the present invention. In FIG. 4, reference numeral 600 denotes a video camera incorporating an image-taking optical system 110, and reference numeral 400 denotes a remote control unit. The remote control unit 400 supplies command signals for driving a zoom lens, an iris (not shown in the drawings) and a focus lens 106 within the image-taking optical system 110 to the camera 600, from a location that is at a certain distance to the camera 600. Reference numeral 500 denotes a remote control cable connecting the camera 600 and the remote control unit 400.

In the remote control unit 400, reference numeral 401 denotes an MF command signal generation circuit, which generates an MF command signal commanding MF control of the focus lens 106. This MF command signal generation circuit 401 generates an MF command signal, which causes the focus lens 106 to move in a direction corresponding to the direction in which a potentiometer-type switch (dial-type or seesaw-type) 401a is operated, in proportion to the operated amount.

Reference numeral 405 denotes a command/switching signal circuit (output switching means). This command/switching signal circuit 405 selectively outputs the MF command signal from the MF command signal generation circuit 401 or an AF/MF switching signal from a ground contact to the same predetermined pin 404a of the twelve terminals (pins) with which the remote control-side connector (first connector) 404 is provided.

More specifically, the command/switching signal circuit 405 includes a switching contact piece 405a, which is connected to the pin 404a of the remote control-side connector 404 and which is switchable between a state of contacting an MF contact connected to the MF command signal generation circuit 401 (MF position: referred to as "first state" in the claims) and a position in which a ground contact (switching contact) is contacted (switching position: referred to as "second state" in the claims). It should be noted that switching contact piece 405a can be operated only to the switching position from the MF position, and when it is not operated anymore, then it is returned by spring force to the MF position, thus constituting a momentary switch.

In the camera 600, reference numeral 102 denotes an evaluation value generation circuit (focus information generation section), which generates a sharpness evaluation value signal from the video signal output from a process circuit 202 (explained later), and reference numeral 103 denotes an AF driving control circuit, which generates such a motor control signal that the sharpness evaluation value generated by the evaluation value generation circuit 102 becomes maximal.

Reference numeral 104 denotes an AF/MF switching circuit, which is controlled by a later-described AF/MF switching judgment circuit 118, and which is switched depending on whether the focus lens 106 is driven by a control signal from the AF driving control circuit (first control section) 103 or whether it is driven by a control signal from a later-described MF driving control circuit (second control section) 109. It should be noted that the AF/MF switching judgment circuit 118 and the AF/MF switching circuit 104 constitute what is referred to in the claims as a "control switching section."

Reference numeral 105 denotes a motor, which is operated by the control signals input from the AF driving control circuit 103 and the MF driving control circuit 109 via the AF/MF switching circuit 104.

Reference numeral 107 denotes a camera-side connector (second connector), to which the remote control cable 500 is connected.

The AF/MF switching judgment circuit 118 is connected to a pin 107a in the camera-side connector 107, this pin 107a being an input terminal for the MF command signal sent from the remote control unit 400 to the MF driving control circuit 109. Therefore, the MF command signal and the switching signal from the remote control unit 400 are input into the AF/MF switching judgment circuit 118. The AF/MF switching judgment circuit 118 switches the AF/MF switching circuit 104 alternately to the MF control side or the AF control side, when the input signal is a switching signal (a signal of 0 V).

The AF/MF switching circuit 104 includes a movable contact piece 104a, which is switchable between a state in which it contacts a contact B connected to the MF driving control circuit 109 and a state in which it contacts a contact A connected to the AF driving control circuit 103, as well as an electromagnet (not shown in the drawings), which moves the movable contact piece 104a. When the AF/MF switching judgment circuit 118 switches the AF/MF switching circuit 104 to the AF control side, a current is sent through the electromagnet of the AF/MF switching circuit 104 to generate a force pulling the movable contact piece 104a to the contact A, setting the movable contact piece 104a to the contact A. And when the AF/MF switching judgment circuit 118 switches the AF/MF switching circuit 104 to the MF control side, no current is sent through the electromagnet of the AF/MF switching circuit 104 (or the current is stopped if a current has been sent up to that time), setting the movable contact piece 104a by spring force to the contact B.

The MF driving control circuit 109 generates a control signal, which drives the motor 105 based on the MF command signal from the remote control unit 400.

Reference numeral 201 denotes an image-pickup device made of a CCD or CMOS sensor or the like. The process circuit 202 processes the signals output from the image-pickup device 201 to generate a video signal of a predetermined format, such as NTSC or PAL format.

Reference numeral 203 denotes a recording/reproducing circuit, which records the video signal output from the process circuit 202 onto a recording medium, such as a tape, a semiconductor memory, an optical disk or the like, or reproduces the recorded video.

In the above-described structure, light flux which has passed through the image-taking optical system 110 forms an image on an image-pickup surface of the image-pickup device 201, and after being photoelectrically converted by the image-pickup device 201, the signal output from the image-pickup device 201 is sampled and held and input into the process circuit 202. The process circuit 202 processes the input signal into a video signal of the predetermined format, and outputs the video signal to the evaluation value generation circuit 102 and the recording/reproducing circuit 203.

In AF control, by filtering the input video signal, the evaluation value generation circuit 102 generates, at vertical synchronization units of the video signal, sharpness evaluation value signals related to the high-frequency components of the video signal, and outputs the sharpness evaluation value signals to the AF driving control circuit 103. While driving the motor 105 to move the focus lens 106 by incremental steps, the AF driving control circuit 103 compares, at vertical synchronization units, the sharpness evaluation value signals, which are successively input from the evaluation value generation circuit 102, and moves the focus lens 106 to a position where the sharpness evaluation value becomes maximal, that is, to the in-focus position. Thus, the AF control of the focus lens 106 is carried out.

More specifically, the AF driving control circuit 103 moves the focus lens 106 in incremental steps, and depending on the change of the sharpness evaluation value in that situation, it is judged whether the in-focus position is further to the tele-angle side or further to the wide-angle side with respect to the current position of the focus lens 106, that is, a driving direction judgment is performed. After that, in accordance with the result of the driving direction judgment, the focus lens 106 is moved at a certain speed in order to detect the peak value of the sharpness evaluation value. This is also referred to as "hill-climbing." After the peak value has been exceeded, the movement direction of the focus lens 106 is reversed, and the focus lens 106 is moved in incremental steps such that it is guided to the position where the sharpness evaluation value becomes maximal. This is referred to as "peak-finding." Thus, the AF control of the focus lens is finished.

It should be noted that after the peak-finding, the sharpness evaluation value is compared with the value found as the peak, while reading the sharpness evaluation value, and if the sharpness evaluation value has changed, then the AF control is started again.

In this embodiment, as in Embodiment 1, the voltage range of the MF command signal output from the MF command signal generation circuit 401 via the command/switching signal circuit 405 set to the MF position is the range from +2.5 V to +7.5 V. That is to say, if the focus lens 106 is speed-controlled, +5.0 V is taken as a stop command signal, in case of +5.0 V to +7.5 V, the focus lens 106 is driven towards infinity and in case of +5.0 V to +2.5 V, the focus lens 106 is driven towards close-range. Moreover, the driving speed of the focus lens 106 (the motor 105) at this time is faster the further the voltage of the MF command signal is removed from +5.0 V, and is the maximal possible driving speed at +7.5 V and +2.5 V, respectively.

On the other hand, the switching signal output from the command/switching signal circuit 405 set to the switching position is 0V, which is outside the voltage range of the MF command signal.

The switching operation between MF and AF control with the AF/MF switching judgment circuit 118 of the present embodiment is explained with reference to the flowchart in FIG. 5.

Figure 5:
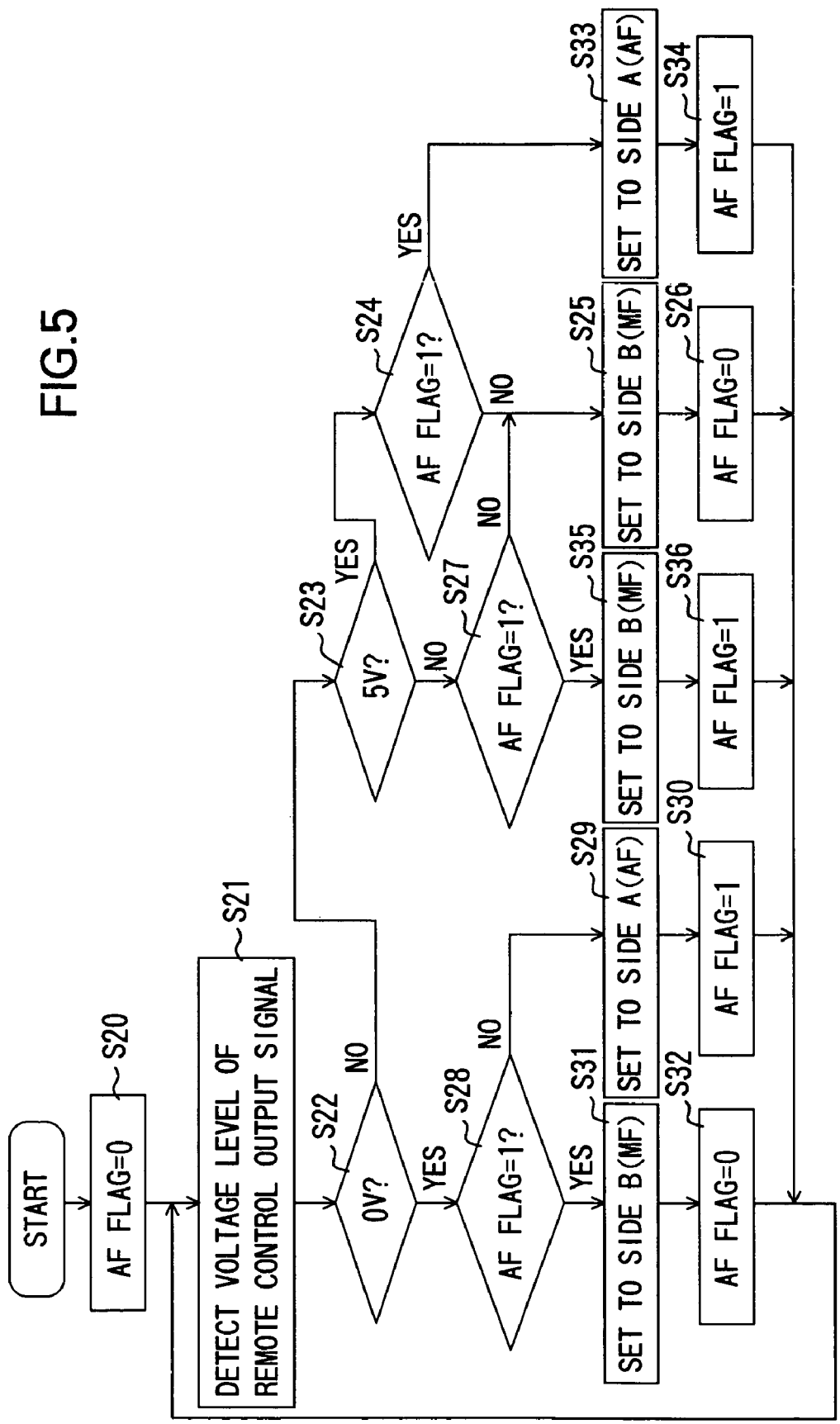
FIG. 5 is a flowchart showing the operation of the optical control system according to Embodiment 3.

At Step 20 in FIG. 5, an AF flag, which indicates whether the camera 600 is in the AF mode or not is set, as an initial value, to "0" (AF-OFF mode). Then, at Step 21, the voltage level of the output signal from the remote control unit 400 is detected.

Next, at Step 22, it is determined whether the detected voltage level is 0 V. If it is not 0 V, then the procedure advances to Step 23, and it is determined whether the detected voltage level is 5 V. Here, it is determined whether the potentiometer-type switch 401a of the MF command signal generation circuit 401 is being operated or not. It should be noted that here, the judgment whether the voltage level is 5 V may actually be a judgment whether the voltage level is in a voltage range having a certain width of several % to about 10% with respect to 5 V.

If the detected voltage level is 5 V, the procedure advances to Step 24, and it is judged whether the AF flag is "1" or not. If the AF flag is not "1", then the procedure advances to Step 25, and no current is sent through the electromagnet, so that the AF/MF switching circuit 104 is set to the side of the contact B (MF control). Thus, the control signal from the MF driving control circuit 109, which has received the MF command signal from the remote control unit 400, is input into the motor 105, and directional and speed control (MF control) of the focus lens 106 is carried out in accordance with the MF command signal. After Step 25, the procedure advances to Step 26, the AF flag is set to "0", and the procedure returns to Step 21.

On the other hand, if the detected voltage level at Step 23 is not 5 V (and not 0 V), then the procedure advances to Step 27, and it is determined whether the AF flag is "1". If the AF flag is not "1", then the procedure advances to Steps 25 and 26, and then returns to Step 21.

If the detected voltage level is 0 V at Step 22, then the procedure advances to Step 28, and it is determined whether the AF flag is "1" or not. If the AF flag is not "1", then the procedure advances to Step 29, and a current is sent through the electromagnet, so that the AF/MF switching circuit 104 is set to the side of the contact A (AF control). Thus, the control signal from the AF driving control circuit 103 is input into the motor 105, and the focus lens 106 is controlled by AF control. After Step 29, the procedure advances to Step 30, the AF flag is set to "1" (AF-ON mode), and the procedure returns to Step 21.

Moreover, if the AF flag is "1" at Step 28, then the procedure advances to Step 31, and the AF/MF switching circuit 104 is set to the side of the contact B (MF control). Then, the procedure advances to Step 32, the AF flag is set to "0", and the procedure returns to Step 21.

Moreover, if the AF flag is "1" at Step 24, then the procedure advances to Step 33, and the AF/MF switching circuit 104 is set to the side of the contact A (AF control). After the Step 33, the procedure advances to Step 34, the AF flag is set to "1" (AF-ON mode), and the procedure returns to Step 21.

Furthermore, if the AF flag is "1" at Step 27, then the procedure advances to Step 35, and the AF/MF switching circuit 104 is set to the side of the contact B (MF control). After that, the procedure advances to Step 36, and then returns to Step 21, with the AF flag still being set to "1" (that is performing MF control while still being in AF-ON mode).

A specific example of the above-described switching operation for MF and AF control is explained with reference to FIG. 6.

Figure 6:
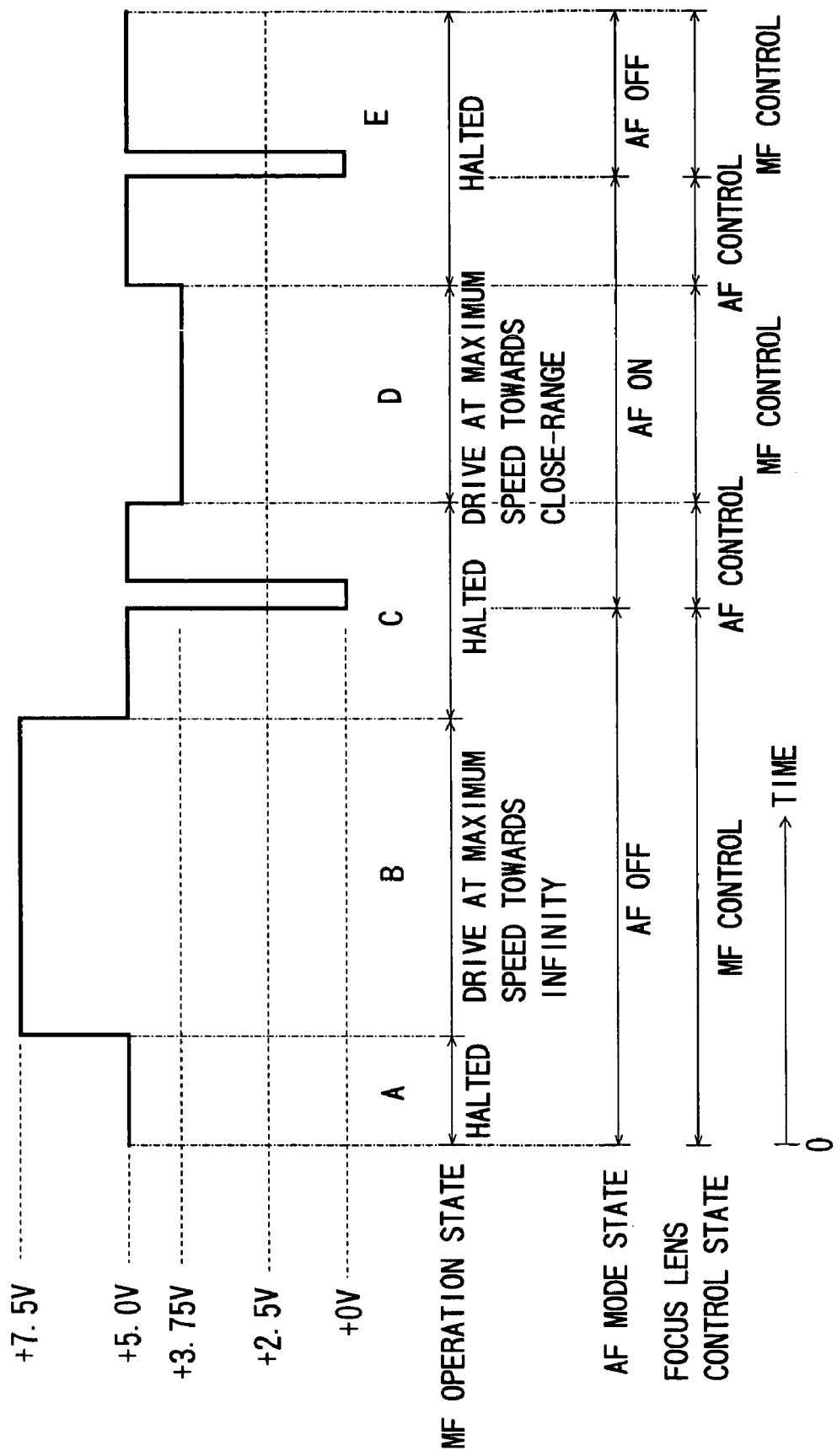
FIG. 6 is a timing chart showing a specific example of the operation of the optical control system of Embodiment 3.

In FIG. 6, the solid line indicates the remote control output signal output from the remote control unit 400, whereas the dotted lines indicate the voltage levels of the remote control output signal. Moreover, the dash-dot lines indicate the breakpoints between the regions A to E, which are described below. The horizontal axis marks time.

First, in region A, the remote control output signal is +5.0 V. In this case, the procedure goes through the Steps 20-21-22-23-24-25-26 in FIG. 5, and is in the MF control state of the AF-OFF mode, but the remote control output signal is +5.0 V, so that the focus lens 106 is halted.

Next, in region B, the remote control output signal becomes +7.5 V, so that the procedure goes through the Steps 21-22-23-27-25-26 in FIG. 5, and stays in the MF control state of the AF-OFF mode. Then, the focus lens 106 is moved at maximum speed to the infinity side by the MF driving control circuit 109.

Next, in region C, when the remote control output signal becomes +5.0 V, the procedure goes through the Steps 21-22-23-24-25-26 in FIG. 5, and the MF control state of the AF-OFF mode is maintained. Then, the focus lens 106 is halted by the MF drive control circuit 109.

However, if in region C the command/switching signal circuit 405 is set to the switching position, and the remote control output signal becomes 0V, then the procedure goes through the Steps 21-22-28-29-30 in FIG. 5, and is switched to the AF-ON mode. Then, AF control of the focus lens 106 with the AF drive control circuit 109 begins.

After that, immediately after the operation of the command/switching signal circuit 405 to the switching position has been released, the remote control output signal, which was 0 V, becomes +5.0 V, the procedure goes through the Steps 21-22-23-24-33-34 in FIG. 5, and the AF control state of the AF-ON mode is maintained.

Next, when in region D the potentiometer-type switch 401a of the MF command signal generation circuit 401 is operated and the remote control output signal becomes +3.75 V, then the procedure goes through the Steps 21-22-23-27-35-36 in FIG. 5, and MF control in the AF-ON mode is performed. That is to say, the focus lens 106 is driven at intermediate speed to the close-range side by the MF driving control circuit 109.

Then, when in region E the operation of the potentiometer-type switch 401a is released and the remote control output signal becomes +5.0 V, then the procedure goes through the Steps 21-22-23-24-33-34 in FIG. 5, and is switched to the AF control state of the AF-ON mode. Therefore, the AF control of the focus lens 106 is started again by the AF driving control circuit 109.

Furthermore, when in region E the command/switching signal circuit 405 is set to the switching position, and the remote control output signal becomes 0V, then the procedure goes through the Steps 21-22-28-31-32 in FIG. 5, and is switched to the MF control state of the AF-OFF mode.

It should be noted that FIG. 6 shows a case where the remote control output signal is thereafter +5.0 V, and as in region A, the focus lens 106 is halted by the MF driving control circuit 109.

Thus, this embodiment uses the pins 404a and 107a of the connectors 404 and 107 assigned for sending MF command signals from the remote control unit 400 to the camera 600, so that it is possible to switch the camera 600 between MF control and AF control from the remote control unit 400.

Consequently, if a conventional camera capable of MF control from the remote control unit is equipped with an AF control function, then MF control and AF control can be switched from the remote control unit even if the electrical interface (connector) has no free terminals (pins), that is, no terminals that are not assigned otherwise, and it is possible to make the operation of the optical control system more convenient.

And what is more, if the potentiometer-type switch 401a of the MF command signal generation circuit 401 is operated during the AF control, then MF control of the focus lens 106 can be performed, so that the usability is better than in the case where MF control cannot be performed unless the command/switching signal circuit 403 is switched from the AF position to the MF position, as in Embodiment 1.

Embodiment 4

In the above-described Embodiment 3, a camera with integrated lens was explained, in which the camera 600 incorporates the image-taking optical system 110, but the present invention can also be applied to optical control systems having an exchangeable lens unit (optical apparatus) that is freely attachable/detachable with respect to the camera.

Figure 7:
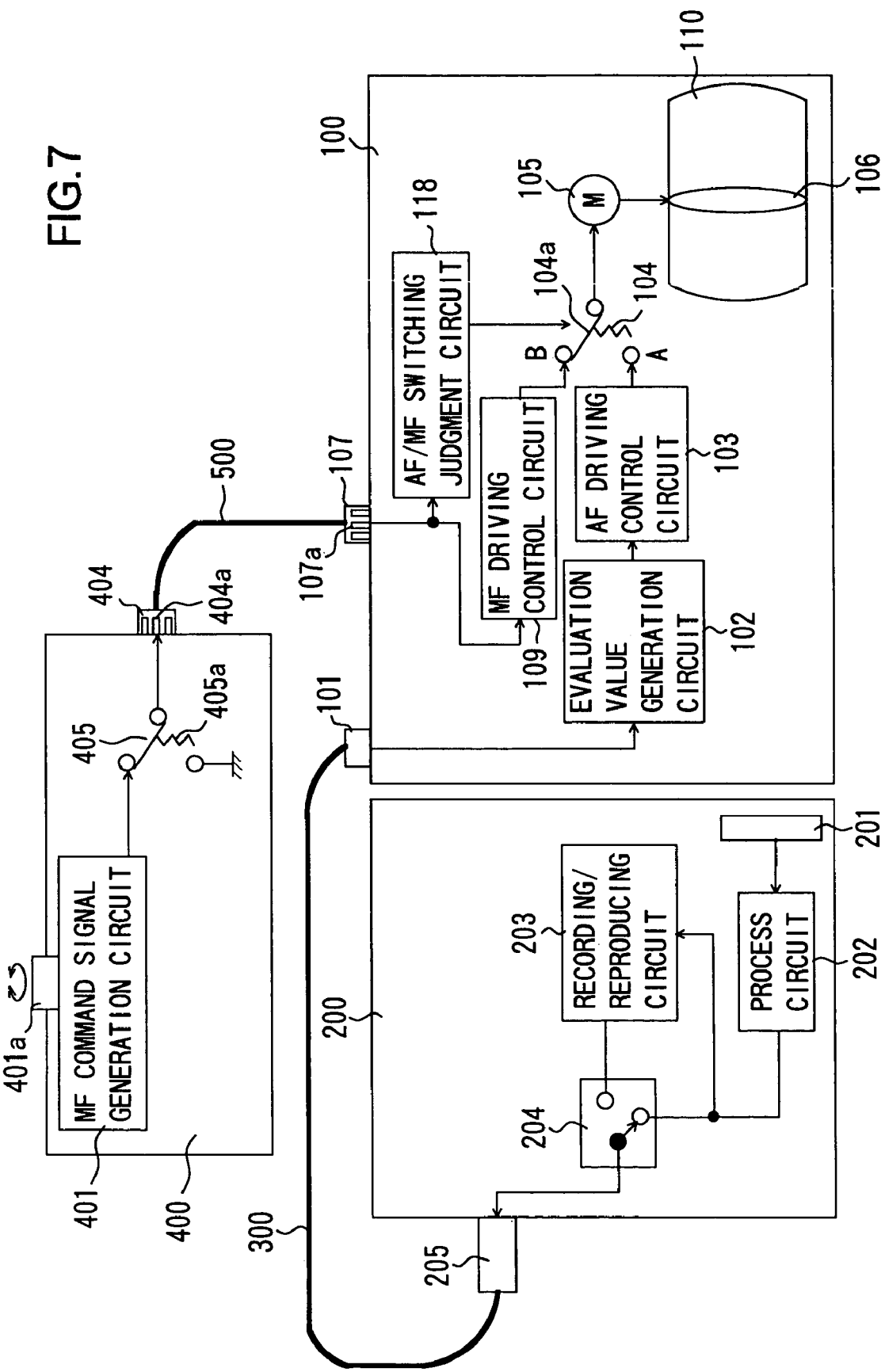
FIG. 7 shows the structure of an optical control system according to Embodiment 4 of the present invention.
Figure 8:
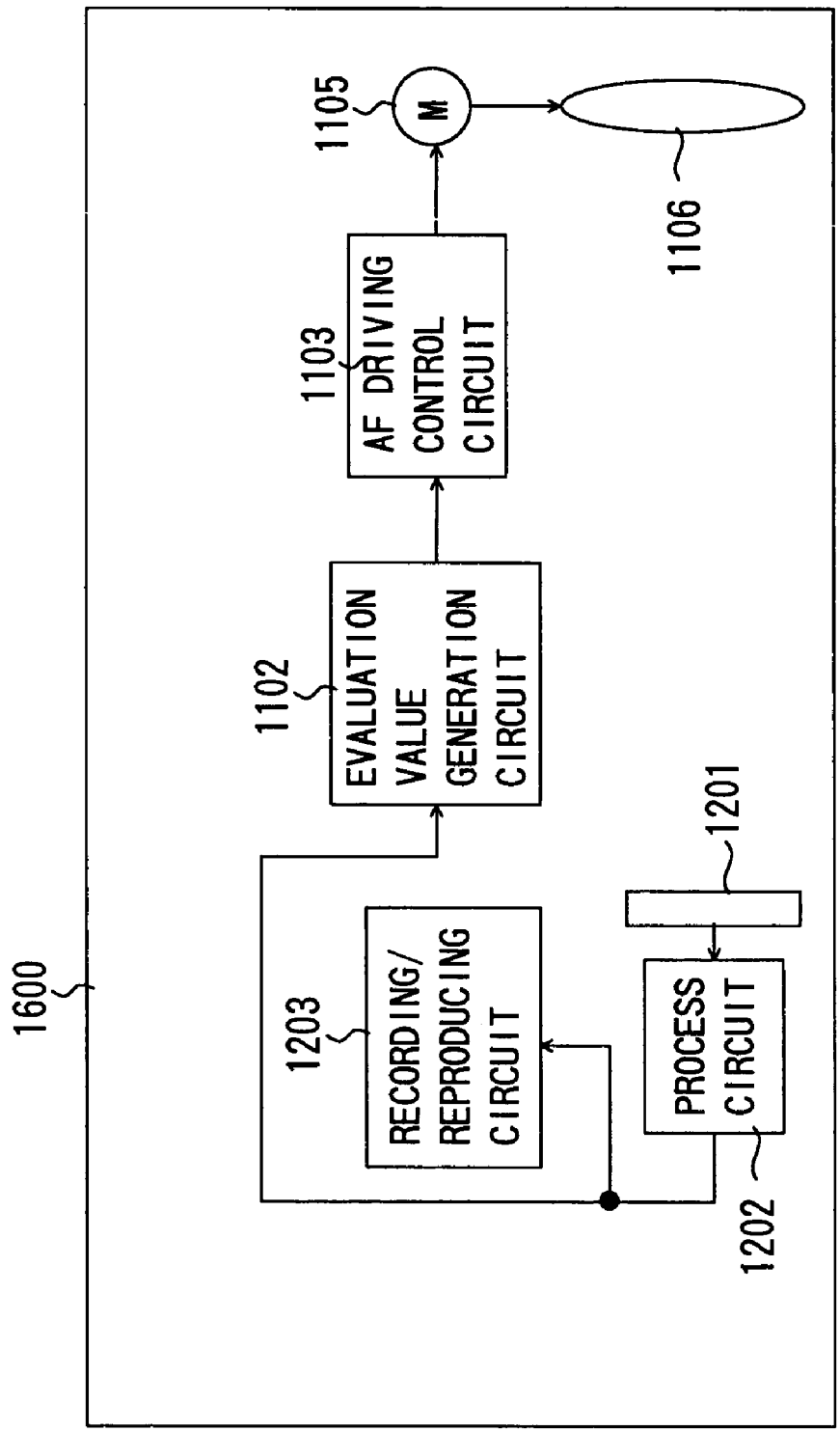
FIG. 8 shows the structure of a conventional optical apparatus.

FIG. 7 shows the structure of an optical control system according to Embodiment 4 of the present invention. In FIG. 7, reference numeral 100 denotes an exchangeable lens unit, and reference numeral 200 denotes a video camera. Reference numeral 300 denotes a coaxial video cable connected to the exchangeable lens unit 100 and the camera 200.

It should be noted that in this embodiment, structural elements that are the same as in Embodiment 3 are denoted by the same reference numerals as in Embodiment 3 (FIG. 4), instead of further explanation. Moreover, in this embodiment, of the structural elements within the camera 600 explained in Embodiment 3, the image-pickup device 201, the process circuit 202 and the recording/reproducing circuit 203 are arranged on the side of the camera 200, whereas the other structural elements are arranged on the side of the lens unit 100. The remote control unit 400 is connected via the connectors 404 and 107 and the remote cable 500 to the lens unit 100.

In the lens unit 100, reference numeral 101 denotes a video input terminal to which video signals are input via the coaxial video cable 300. Moreover, in the camera 200, reference numeral 204 denotes a video switching circuit, which selects and outputs either the video signals output from the process circuit 202 or the video signals output from the recording/reproducing circuit 203. Reference numeral 205 denotes a video output terminal, which outputs the video signals output from the video switching circuit 204 via the coaxial video cable 300 to the lens unit 100.

In this structure, after the light flux passing through the image-taking optical system 110 on the side of the lens unit 100 is imaged onto the image-pickup plane of the image-pickup device 201 on the side of the camera 200 and photoelectrically converted by the image-pickup device 201, the output signal of the image-pickup device 201 is sampled and held and input into the process circuit 202. The process circuit 202 processes the input signal into a video signal of the predetermined format, and outputs it to the video switching circuit 204 and the recording/reproducing circuit 203.

During the recording operation, the video switching circuit 204 outputs the video signals from the process circuit 202 to the video output terminal 205. In this case, the recording/reproducing circuit 203 records the video signal from the process circuit 202 onto a recording medium. Moreover, when reproducing recorded video, the recording/reproducing circuit 203 reproduces the video signals recorded on a recording medium, and when these video signals have been stably reproduced, the video switching circuit 204 outputs the video signals from the recording/reproducing circuit 203 to the video output terminal 205.

Then, the video signals are input from the video output terminal 205 via the coaxial video cable 300 and the video input terminal 101 of the lens unit 100 into the evaluation value generation circuit 102.

By filtering the input video signal, the evaluation value generation circuit 102 generates, at vertical synchronization units of the video signal, a sharpness evaluation value signal related to the high-frequency components of the video signal, and outputs the sharpness evaluation value signal to the AF driving control circuit 103. While driving the motor 105 to move the focus lens 106 by incremental steps, the AF driving control circuit 103 compares, at vertical synchronization units, the sharpness evaluation value signals, which are successively input from the evaluation value generation circuit 102, and moves the focus lens 106 to a position where the sharpness evaluation value becomes maximal, that is, to the in-focus position. Thus, the AF control of the focus lens 106 is carried out.

In the present embodiment, the switching operation between MF and AF control with the AF/MF switching judgment circuit 118 is the same as that explained for Embodiment 3 (FIG. 5).

Also the present embodiment uses the pins 404a and 107a of the connectors 404 and 107 assigned for sending MF command signals from the remote control unit 400 to the lens unit 100, so that it is possible to switch the lens unit 100 between MF control and AF control from the remote control unit 400.

Consequently, if a conventional exchangeable lens unit capable of MF control from the remote control unit is equipped with an AF control function, then MF control and AF control can be switched from the remote control unit even if the electrical interface (connector) has no free terminals (pins), that is, no terminals that are not assigned otherwise, and it is possible to make the operation of the optical control system more convenient.

And what is more, if the potentiometer-type switch 401a of the MF command signal generation circuit 401 is operated during the AF control, then MF control of the focus lens 106 can be performed, so that the usability is better than in the case where MF control cannot be performed unless the command/switching signal circuit 403 is switched from the AF position to the MF position, as in Embodiment 1.

It should be noted that the voltage range of the MF command signals and the voltage value for the AF switching signal given in Embodiments 3 and 4 are merely examples, and other voltage ranges and voltage values are also possible.

Furthermore, Embodiments 3 and 4 were explained for the case that automatic control and manual control of the focus lens is performed, however, it is also possible to apply the present invention to cases where automatic control and manual control of other optical adjusting members, such as the zoom lens or the iris, are performed.

Furthermore, the present invention can also be applied to optical control systems including various kinds of optical apparatuses, such as TV cameras, video cameras, TV lenses or video lenses.

As explained in the foregoing, embodiments of the present invention use a connector terminal assigned to sending command signals from the remote control unit to the optical apparatus, thus making it possible to select automatic control or manual control of an optical adjusting means from the remote control unit.

Consequently, if a conventional optical apparatus, which used to have only a manual control function of the optical adjusting means, is equipped with an automatic control function, then it is possible to select automatic control and manual control of the optical adjusting means from the remote control unit, even if there are no unassigned connector terminals, and it is possible to make the operation of the optical control system more convenient.

While preferred embodiments have been described, it is to be understood that modification and variation of the present invention may be made without departing from scope of the following claims.

What is claimed is:
1. An optical control system comprising:
 a control unit comprising a command signal generation section, which generates a command signal in response to operation of an operating member, and a first connector, which is connected to a communication cable and outputs the command signal from a first terminal thereof via the communication cable; and an optical apparatus comprising an optical adjusting member, which is movable to perform an optical action, an actuator driving the optical adjusting member, a second connector which is connected to the communication cable, a first control section, which controls the actuator based on the command signal input via a second terminal of the second connector from the control unit, a second control section, which controls the actuator based on predetermined information, and a control switching section, which selects, from the first and the second control sections, the control section controlling the driving of the actuator;

wherein the control unit comprises an output switching section, which is switchable between a first state, in which the command signal from the command signal generation section is output via the first terminal of the first connector, and a second state, in which a switching signal for selecting the second control section, the voltage level of the switching signal being different from that of the command signal, is output from the first terminal; and wherein the control switching section of the optical apparatus selects the first control section in response to input of the command signal, and selects the second control section in response to the switching signal, which is input from the second terminal of the second connector.

2. The optical control system according to claim 1, wherein the optical apparatus comprises an image-taking optical system including a focus lens as the optical adjusting member, and a focus information generation section generating information serving as the predetermined information, which changes depending on a focus state of the image-taking optical system, the information being based on a video signal taken with the image-taking optical system.

3. An optical control system comprising:

a control unit comprising a command signal generation section, which generates a command signal in response to operation of an operating member, and a first connector, which is connected to a communication cable and outputs the command signal from a first terminal thereof via the communication cable; and an optical apparatus comprising an optical adjusting member, which is movable to perform an optical action, an actuator driving the optical adjusting member, a second connector which is connected to the communication cable, a first control section, which controls the actuator based on the command signal input via a second terminal of the second connector from the control unit, a second control section, which controls the actuator based on predetermined information, and a control switching section, which selects, from the first and the second control sections, the control section controlling the driving of the actuator;

wherein the control unit comprises an output switching section, which is switchable from a first state, in which the command signal from the command signal generation section is output via the first terminal of the first connector, to a second state, in which a switching signal for selecting one of the first control section and the second control section, is output from the first terminal, the output switching section being restored to the first state from the second state when the switching operation is released; and wherein the control switching section of the optical apparatus selects the first control section and the second control section in alternation in response to input of the switching signal from the second terminal of the second connector, and the first control section is selected when the command signal is input while the second control section is selected.

4. The optical control system according to claim 3, wherein the control switching section selects the first control section when a specific command signal other than a stop command signal is input while the second control section is selected.

5. The optical control system according to claim 4, wherein after the control switching section has selected the first control section in response to the specific command signal being input while the second control section is selected, the control switching section selects the second control section when the stop command signal is input.

6. The optical control system according to claim 3, wherein the output switching section is switchable from a first state, in which the command signal from the command signal generation section is output via the first terminal of the first connector, to a second state, in which a switching signal for selecting one of the first control section and the second control section, the voltage level of the switching signal being different from that of the command signal, is output from the first terminal.

7. The optical control system according to claim 3, wherein the optical apparatus comprises an image-taking optical system including a focus lens as the optical adjusting member, and a focus information generation section generating information serving as the predetermined information, which changes depending on a focus state of the image-taking optical system, the information being based on a video signal taken with the image-taking optical system.

* * * * *